(12) United States Patent
Keane et al.

(10) Patent No.: US 9,334,129 B2
(45) Date of Patent: May 10, 2016

(54) METHOD AND APPARATUS FOR AUTOMATED FILLING OF A MAIL TRAY FROM A VERTICAL STACKER

(75) Inventors: Joseph J. Keane, Souderton, PA (US);
Donato C. Farole, Lehighton, PA (US);
Glenn A. Nester, Pottstown, PA (US)

(73) Assignee: Pitney Bowes Inc., Stamford, CT (US)

( * ) Notice: Subject to any disclaimer, the term of this patent is extended or adjusted under 35 U.S.C. 154(b) by 978 days.

(21) Appl. No.: 13/488,744

(22) Filed: Jun. 5, 2012

(65) Prior Publication Data
US 2013/0320609 A1 Dec. 5, 2013

(51) Int. Cl.
| | |
|---|---|
| B65H 7/00 | (2006.01) |
| B65G 59/06 | (2006.01) |
| B65H 29/38 | (2006.01) |
| B65H 31/22 | (2006.01) |
| B65H 31/26 | (2006.01) |
| B65H 31/30 | (2006.01) |
| B65H 29/14 | (2006.01) |
| B65H 31/06 | (2006.01) |

(Continued)

(52) U.S. Cl.
CPC ............. *B65G 59/067* (2013.01); *B65H 3/124* (2013.01); *B65H 7/00* (2013.01); *B65H 29/14* (2013.01); *B65H 29/38* (2013.01); *B65H 31/06* (2013.01); *B65H 31/22* (2013.01); *B65H 31/26* (2013.01); *B65H 31/3081* (2013.01); *B65B 5/08* (2013.01); *B65H 2301/34112* (2013.01); *B65H 2301/4237* (2013.01); *B65H 2301/42146* (2013.01); *B65H 2301/422548* (2013.01); *B65H 2701/1916* (2013.01)

(58) Field of Classification Search
CPC .......... B65B 5/08; B65B 57/14; B65B 35/26; B65B 35/54; B65G 47/30; B65H 7/00; B65H 29/38; B65H 31/22; B65H 31/26; B65H 31/3081; B65H 3/124; B65H 2701/1916; B65H 2301/4237
See application file for complete search history.

(56) References Cited

U.S. PATENT DOCUMENTS

| | | | | |
|---|---|---|---|---|
| 4,161,095 A | * | 7/1979 | Buday ................... | B65B 25/143 53/244 |
| 4,237,677 A | * | 12/1980 | Klapp ................... | B65B 25/143 192/143 |

(Continued)

OTHER PUBLICATIONS

HSW Marketing Material entitled: "Mail Logistics for professionals" taken from: http://www.hsw-gmbh.com/produkte_pbs_durchdacht.php on May 25, 2012. 9 pages.

*Primary Examiner* — Christopher Harmon
(74) *Attorney, Agent, or Firm* — Michael J. Cummings; Charles R. Malandra, Jr.; Steven Shapiro

(57) ABSTRACT

An automated mail tray filling apparatus for taking envelopes from a vertical stacker output of an inserter machine and placing them in mail trays. A vertical stack of envelopes rests on a long stacker table. The mail tray filling apparatus has a track positioned next the vertical stacker table parallel to the length of the vertical stacker table. A mail tray transport is positioned beneath the track and arranged to transport mail trays beneath the track in a direction parallel to the vertical stacker table. A movable mail tray filler is movably mounted on the track to travel in parallel next to the vertical stacker table and above the mail tray transport, and is arranged to withdraw envelopes from the end of the vertical stack in a sideways direction. Envelopes are then redirected into a downward direction and fed into a mail tray positioned beneath the movable mail tray filler.

7 Claims, 11 Drawing Sheets

(51) Int. Cl.
  *B65H 3/12* (2006.01)
  *B65B 5/08* (2006.01)

(56) References Cited

U.S. PATENT DOCUMENTS

| | | | | |
|---|---|---|---|---|
| 4,294,059 A * | 10/1981 | Stilwell | B65B 25/046 | 198/434 |
| 4,398,383 A * | 8/1983 | Prakken | B65B 5/061 | 53/247 |
| 4,615,519 A * | 10/1986 | Holodnak | B65H 3/5246 | 271/122 |
| 4,800,703 A * | 1/1989 | Goodman | B65B 5/08 | 53/244 |
| 4,864,801 A * | 9/1989 | Fallas | B65B 5/061 | 53/247 |
| 5,044,143 A * | 9/1991 | Ako | B65B 5/105 | 53/247 |
| 5,347,790 A | 9/1994 | Romanenko et al. | | |
| 5,372,360 A * | 12/1994 | Ricciardi | B65H 29/18 | 271/177 |
| 5,429,249 A * | 7/1995 | Belec | B07C 1/00 | 209/584 |
| 6,064,023 A * | 5/2000 | Lile | B07C 1/00 | 209/569 |
| 6,250,625 B1 * | 6/2001 | Janatka | B43M 3/04 | 270/58.06 |
| 6,398,204 B1 | 6/2002 | Keane et al. | | |
| 6,425,579 B1 * | 7/2002 | Andreyka | B65H 1/025 | 104/166 |
| 6,536,191 B1 * | 3/2003 | Ruggiero | B07C 1/025 | 271/207 |
| 7,107,742 B2 * | 9/2006 | Blanc | B65B 5/105 | 53/153 |
| 7,213,386 B2 * | 5/2007 | Hooper | B65B 5/08 | 198/419.3 |
| 7,412,809 B2 * | 8/2008 | Yuyama | B65B 5/105 | 294/86.4 |
| 7,600,751 B2 | 10/2009 | Rozenfeld | | |
| 8,033,084 B1 * | 10/2011 | Peterson | B65B 5/10 | 53/245 |
| 8,714,340 B2 * | 5/2014 | Keane | B65H 29/14 | 198/418.6 |
| 2004/0080096 A1 * | 4/2004 | Holbrook | B65H 15/00 | 271/185 |
| 2006/0087068 A1 * | 4/2006 | Bittenbender | B65H 1/025 | 271/2 |
| 2008/0053039 A1 * | 3/2008 | Vissers | B65B 5/06 | 53/247 |
| 2008/0141619 A1 * | 6/2008 | Ponti | B65B 25/143 | 53/55 |
| 2012/0292845 A1 * | 11/2012 | De Ambrogio | B65H 1/025 | 271/10.01 |
| 2013/0291493 A1 * | 11/2013 | Laudet | B65B 5/08 | 53/475 |

\* cited by examiner

METHOD AND APPARATUS FOR AUTOMATED FILLING OF A MAIL TRAY FROM A VERTICAL STACKER

TECHNICAL FIELD

The present invention relates to automated filling of mail trays with envelopes from a mail production machine.

BACKGROUND OF THE INVENTION

A mail insertion system or a "mailpiece inserter" is commonly employed for producing mailpieces intended for mass mail communications. Such mailpiece inserters are typically used by organizations such as banks, insurance companies and utility companies for producing a large volume of specific mail communications where the contents of each mailpiece are directed to a particular addressee. Also, other organizations, such as direct mailers, use mailpiece inserters for producing mass mailings where the contents of each mailpiece are substantially identical with respect to each addressee.

In many respects, a typical inserter resembles a manufacturing assembly line. Sheets and other raw materials (i.e., a web of paper stock, enclosures, and envelopes) enter the inserter system as inputs. Various modules or workstations in the inserter system work cooperatively to process the sheets until a finished mail piece is produced. The precise configuration of each inserter system depends upon the needs of each customer or installation.

Typically, inserter systems prepare mall pieces by arranging preprinted sheets of material into a collation, i.e., the content material of the mail piece, on a transport deck. The collation of preprinted sheets may continue to a chassis module where additional sheets or inserts may be added based upon predefined criteria, e.g., an insert being sent to addressees in a particular geographic region. From the chassis module the fully developed collation may continue to a stitched module where the sheet material may be stitched, stapled or otherwise bound. Subsequently, the bound collation is typically folded and placed into envelopes. Once filled, the envelopes are closed, sealed, weighed, and sorted. A postage meter may then be used to apply postage indicia based upon the weight and/or size of the mail piece. The mailpieces will then be moved to a stacker where mailpieces are collected and stacked, either on edge or laid flat. An exemplary on-edge stacker, or vertical stacker, is depicted in U.S. Pat. No. 6,398, 204 titled On-Edge Stacking Apparatus, which is hereby incorporated by reference in its entirety.

In a final step, the mailpieces are manually removed by an operator from the stacker and placed into mail trays or other storage containers. Such manual collection and removal is pragmatic, reliable and fiscally advantageous when the time of mailpiece removal can be shared and/or absorbed within the overall labor requirements associated with managing/operating the mailpiece inserter system. That is, this task can be efficiently performed when sufficient idle time exists between various other operational tasks, e.g., removing outsorted mailpieces, cleaning/removing paper dust from various optical readers/scanning devices, etc., to periodically or intermittently unload the mailpiece stacker.

Advances in the art of mailpiece inserters have vastly increased the total mailpiece volume and rate of mailpiece production. For example, the Advanced Productivity System (APS) inserter system produced by Pitney Bowes Inc., located in Stamford, Conn., USA, can produce as many as twenty-six thousand (26,000) mailpieces in one hour of operation. Accordingly, hundreds of mail trays, collectively weighing over 11,000 lbs, must be removed and transported each hour by a system operator. In fact, the volume of mailpieces produced is sufficiently large that several system operators may be required to concentrate on the single/sole task of mailpiece collection and removal. Aside from the time associated with this final unloading step, it will be appreciated that the collection, removal and transport of such large mailpiece quantities can be highly demanding in terms of the physical workload. It will also be recognized that such physical demands can lead to inconsistent or reduced mailpiece throughput if/when the workload requirements are not properly balanced with the high volume mailpiece output.

A need, therefore, exists for an apparatus for stacking mailpieces produced by high volume mailpiece inserters, which apparatus ensures consistent throughput, is fiscally advantageous and provides a viable alternative to manual mailpiece collection and removal.

Prior art systems that have attempted to meet this need include: (i) a device that lifts mail trays onto their side to receive pre-formed stacks of envelopes (U.S. Pat. No. 7,600, 751); (ii) a stationary device that individually fed envelopes into a mail tray that had been lifted up from below (U.S. Pat. No. 6,536,191); and (iii) a device that dropped vertical stacks of envelopes into mail trays using a trap-door arrangement (U.S. Pat. No. 5,347,790).

SUMMARY OF THE INVENTION

The invention is an automated mail tray filling apparatus for taking envelopes from a vertical stacker output of an inserter machine and placing them in mail trays. The vertical stacker provides a vertical stack of finished envelopes on a long vertical stacker table. The vertical stacker table is capable of transporting the vertical stack away from an inserter output where envelopes are added to the stack.

The mail tray filling apparatus described herein can easily be combined with an existing vertical belt stacker such as the one described in U.S. Pat. No. 6,398,204, On-Edge Stacking Apparatus, incorporated by reference herein. Minimal modifications are needed to an existing inserter and vertical stacker to enable them to work in combination with the new tray filler apparatus.

In a preferred embodiment, the existing vertical stacker operates in its normal fashion. The tray filling apparatus includes independent intelligence that senses the presence of stacked envelopes and feeds the envelopes into waiting trays. A movable mail tray filler is capable of moving back and forth relative to the length of the vertical stack, so that the stacker can continue to feed regardless of variations in the output from the inserter machine to the vertical stacker.

In this fashion, the vertical stacker acts as a buffer for the tray filling apparatus. Even if there is an interruption in the production of filled envelopes from the inserter machine, the tray filling apparatus can continue feeding by moving the feeding component along the stack towards its upstream end. If the tray filling apparatus needs to pause, to change mail trays, for example, then the movable tray filler can move downstream on the vertical stacker to allow space for more envelopes to be added from the inserter.

The mail tray filling apparatus has a track positioned next the vertical stacker table parallel to the length of the vertical stacker table. A mail tray transport is positioned beneath the track and arranged to transport mail trays beneath the track in a direction parallel to the vertical stacker table. A movable mail tray filler is movably mounted on the track to travel in parallel next to the vertical stacker table and above the mail tray transport and arranged to withdraw envelopes from a distal end of the vertical stack in a sideways direction. Envelopes are then redirected into a downward direction and fed into a mail tray positioned beneath the movable mail tray filler.

A take-away feeder is positioned over the vertical stacker table and arranged to withdraw individual envelopes from the vertical stack in a sideways direction. The take-away feeder includes a pressure sensor to determine if there is enough pressure to feed envelopes from the stack.

The movable mail tray filler can move back and forth along the track in response to different pressure conditions at the pressure sensor. The filler transport moves incrementally on the track towards the inserter output end of the vertical stacker when the vertical stack pressure is less than a predetermined threshold, thereby moving the take-away feeder into closer contact with the distal end of the vertical stack. When the mail tray filler is in a non-feeding mode, the take-away feeder is allowed to move down the stacker to make room for additional envelopes.

After the envelope has been removed in the sideways direction, the envelope is redirected in a downward direction by first ejecting the envelope into an open space. A downward tamping mechanism positioned above the open space moves downward to push on a top edge of the free-floating envelope. A downward transport positioned beneath the open space receives and transports envelopes pushed downward by the downward tamping mechanism.

Preferably, the downward tamping mechanism is an inverted L shaped pusher, positioned to contact the top edge of the envelope on an interior corner of the inverted L. In the preferred embodiment the downward motion of the pusher is at an acute angle to push the envelope towards the receiving transport.

Feeding of envelopes from the vertical stacker into the mail tray filler is preferably controlled so as to maintain a stack size that is within an optimal range. Stacks that are too short may not have consistent pressure at the take-away feeder. Stacks that are too long may result in skewed stacks because of uneven thickness of the mail in the envelopes. Allowing very long vertical stacks could also require additional machinery and structure to handle mail trays that need to be positioned underneath the filler apparatus. Such additional structure could have a negative impact on the desired floors space footprint of the apparatus.

To achieve feeding within the optimal range on the vertical stacker, the mail tray filler apparatus operates as a function of the pressure detected at the take-away feeder, the position of the take-away feeder, and the operational status of the mail tray filler. The apparatus determines whether a predetermined trigger pressure has been reached at the pressure sensor. The apparatus also determines whether the mail tray filler is in a paused mode.

If the predetermined trigger pressure has been exceeded, and the mail tray filler is not in pause mode, then envelopes are fed from the vertical stack using the take-away feeder. If the predetermined trigger pressure has been exceeded, and the mail tray filler is in pause mode, then envelopes are not fed from the vertical stack and the mail tray filler is moved in a downstream direction of the vertical stacker, thereby making room for more envelopes on the vertical stacker. If the predetermined trigger pressure has not been exceeded, and the mail tray filler is not in pause mode, then the mail tray filler is moved in an upstream direction of the vertical stacker to bring the take-away feeder into contact with the vertical stack. If the take-away feeder is not within the optimized range, the stack is allowed to get bigger until it is.

DETAILED DESCRIPTION

Figure 1:
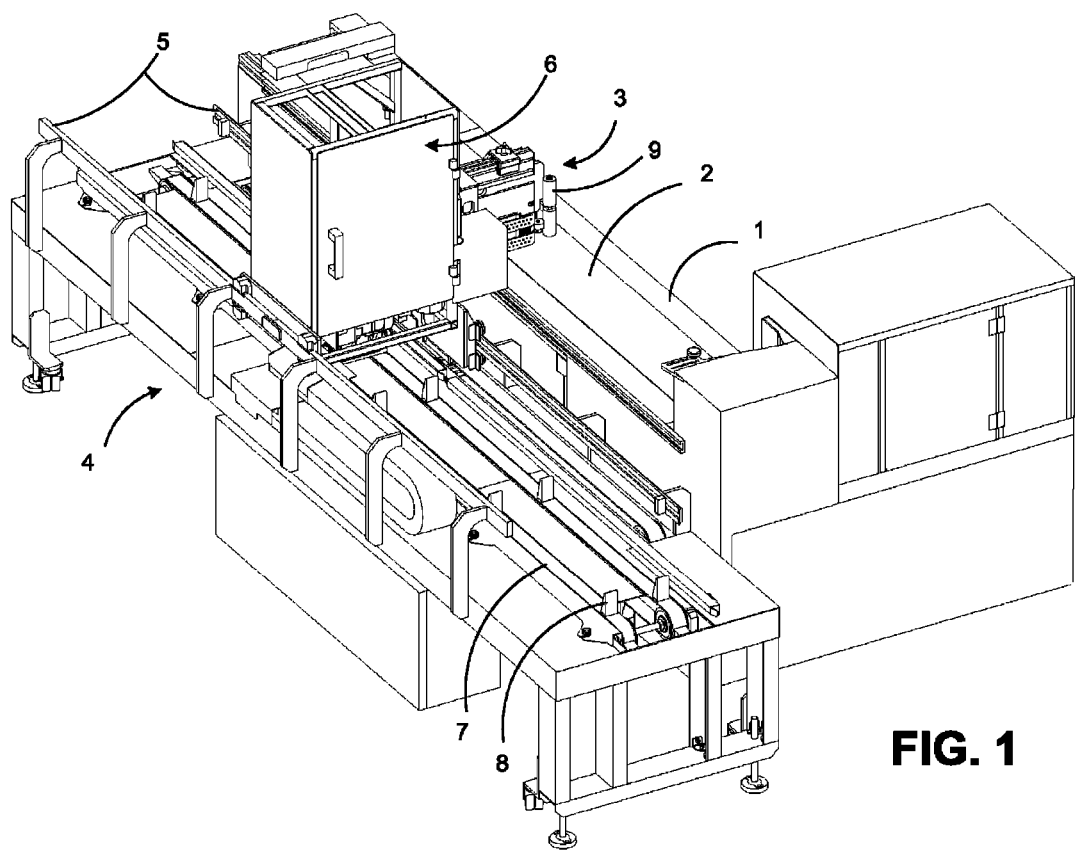
FIG. 1 shows the mail tray filler apparatus next to a vertical stacker module in the preferred arrangement.

FIG. 1 shows the arrangement of the mail tray filler apparatus 4 relative a conventional vertical stacker unit 1 typically used at the output end of a high speed mail inserter machine. The vertical stacker 1 includes a horizontal table over which a flexible flat belt 2 is positioned for the purpose of moving the vertical stack from an upstream end of the table to a downstream end, as more envelopes from the inserter are added to the stack. A movable mail tray filler unit 6 is movably mounted on tracks 5, enabling the mail tray filler 6 to move in the upstream and downstream directions parallel with the vertical stacker 1.

The apparatus 4 is controlled using standard processors, controllers, and motors as used in the mail handling equipment field. In an exemplary embodiment, the controller is a Mitsubishi Q series PLC (programmable logic controller). A PLC is a specialized small computer with a built-in operating system designed specifically for controlling machinery. PLC operating systems are able to process incoming events and to react in real time. Another advantage of a PLC is that it is designed to operate reliably in an industrial environment.

The PLC has input lines where sensors are connected to notify upon events (e.g. pressures above/below a certain level, envelopes sensed at a particular location, etc.), and it has output lines to signal any reaction to the incoming events (e.g. feed an envelope, move the mail tray. etc.). Where the system includes analog sensors (for example analog pressure sensors) an A/D converter is used to generate the digital signal for input into the PLC. The system is user programmable using standard PLC programming language. Ladder logic programming is used in the preferred embodiment for programming the PLC for the functionality described herein.

In an alternative embodiment, control of the mail tray filler apparatus 4 may be handled by a standard personal computer (PC), as are often used in connection with operating systems for inserter systems. Thus, a controller for the inserter system (and vertical stacker 1) may be configured to perform the same functions as the PLC. An advantage of integration with the inserter controller computer would be greater visibility and tracking of mail pieces through the final processing and placement in the mail trays.

The trayer apparatus 4 includes a touch screen display coupled to the controller to enable all of the interactions and inputs described herein. For example, the display can show the operational status of the machine, and can be used for displaying or inputting various parameters for machine operation, as described further herein. Any other type of human-machine interface can also be used in place of a touch screen display.

For instances, where communication is desired between the trayer apparatus 4 and the vertical stacker 1 (and the corresponding inserter system), a serial communication card may be used for communication between the respective controllers. In the preferred embodiment the controller for the trayer apparatus 4 is an RS232 serial controller.

The movable filler unit 6 includes a take-away feeder 3 that is typically positioned at a downstream end of the envelope stack resting on the vertical stacker 1. The take-away feeder 3 serves as a support to hold the downstream end of the envelope stack upright, and moves upstream and downstream with the movable filler unit 6 to apply the appropriate pressure to maintain the stack of envelopes standing on-edge. A pressure sensor 9 is mounted on take-away feeder 3 for purposes of detecting the stack pressure in connection with controlling feeding operations and movement.

Beneath the movable filler unit 6 and tracks 5, a mail tray transport 7 is positioned to provide mail trays 10 to be filled underneath movable filler unit 6. In the preferred embodiment, mail trays 10 are moved into position for filling in a transport path parallel to the vertical stacker 1. Pushers 8 push the mail trays 10 on transport 7, and define the relative positioning subsequent trays.

Figure 2:
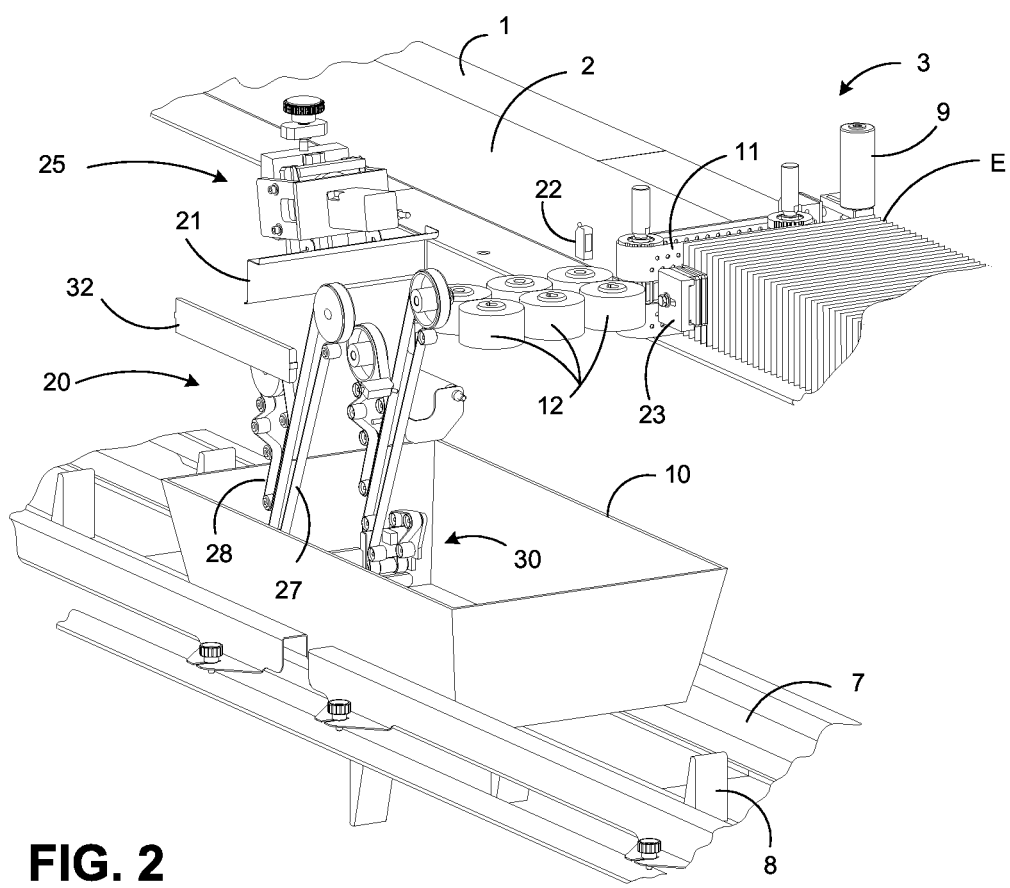
FIG. 2 shows the paper path for feeding envelopes from the stacker into mail trays.
Figure 3:
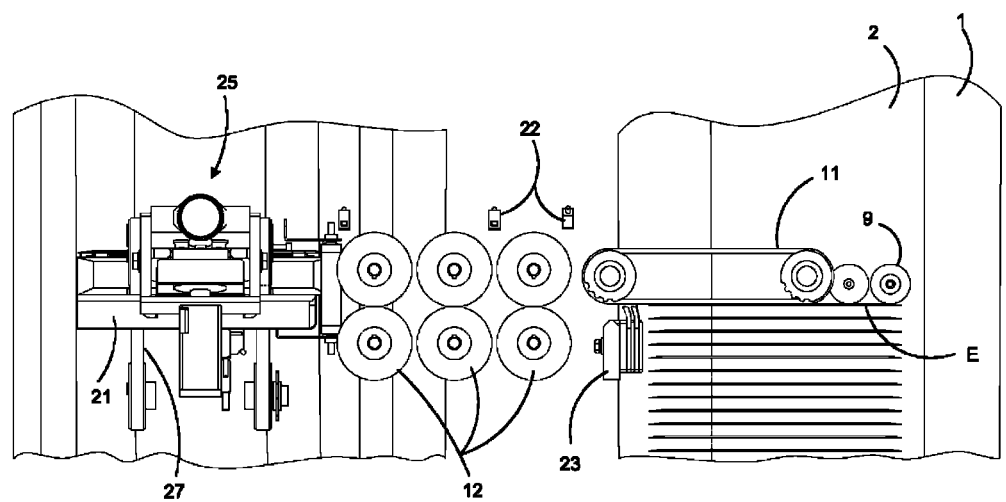
FIG. 3 is a top view of mechanism for feeding envelopes from the vertical stacker in the sideways direction.
Figure 4:
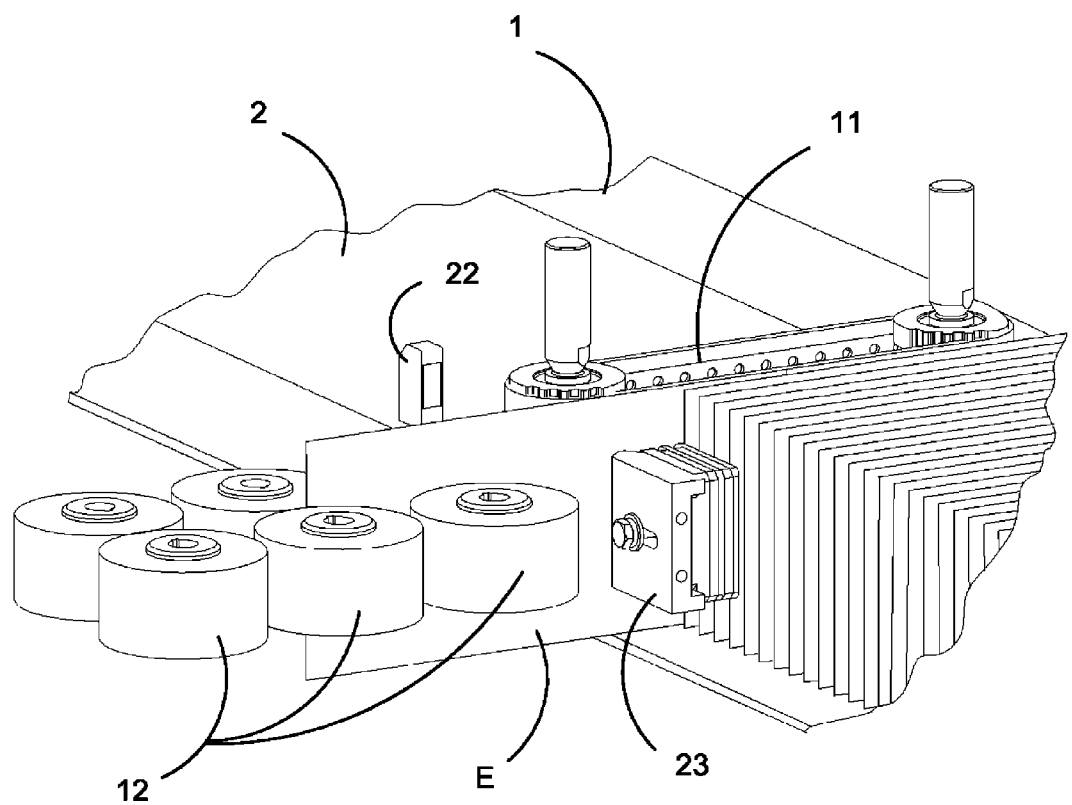
FIG. 4 is an isometric view showing an envelope being fed from the vertical stack.

FIGS. 2-4 show the transport path by which the envelopes E move from the vertical stacker 1 into tray 10. A vacuum belt 11 on take-away feeder 3 singulates envelopes from the stack in cooperation with a stripping unit 23 and feeds them to transport nips 12. For this portion of the apparatus, it will be understood that other conventional mechanisms for separating, feeding and transporting a vertical envelopes can be used. An optical sensor 22 positioned proximal to the take-away feeder 3 detects the feeding of individual envelopes E from the stack.

Downstream of the nips 12 is the region of the filler unit 4 in which the envelope E is redirected in the downward direction. Preferably, the nips 12 feed the envelope into an open space. At the far end of the open space is a stopping barrier 32. Above the open space is a downward tamping mechanism 25 that serves to bat the envelope in a downward direction into downward feeding arm 20. In the preferred embodiment, downward feeding arm 20 is comprised of belts 27 and 28 that bring envelopes to the feeding head 30 that deposits envelopes in a pack in the tray 10.

Figure 5:
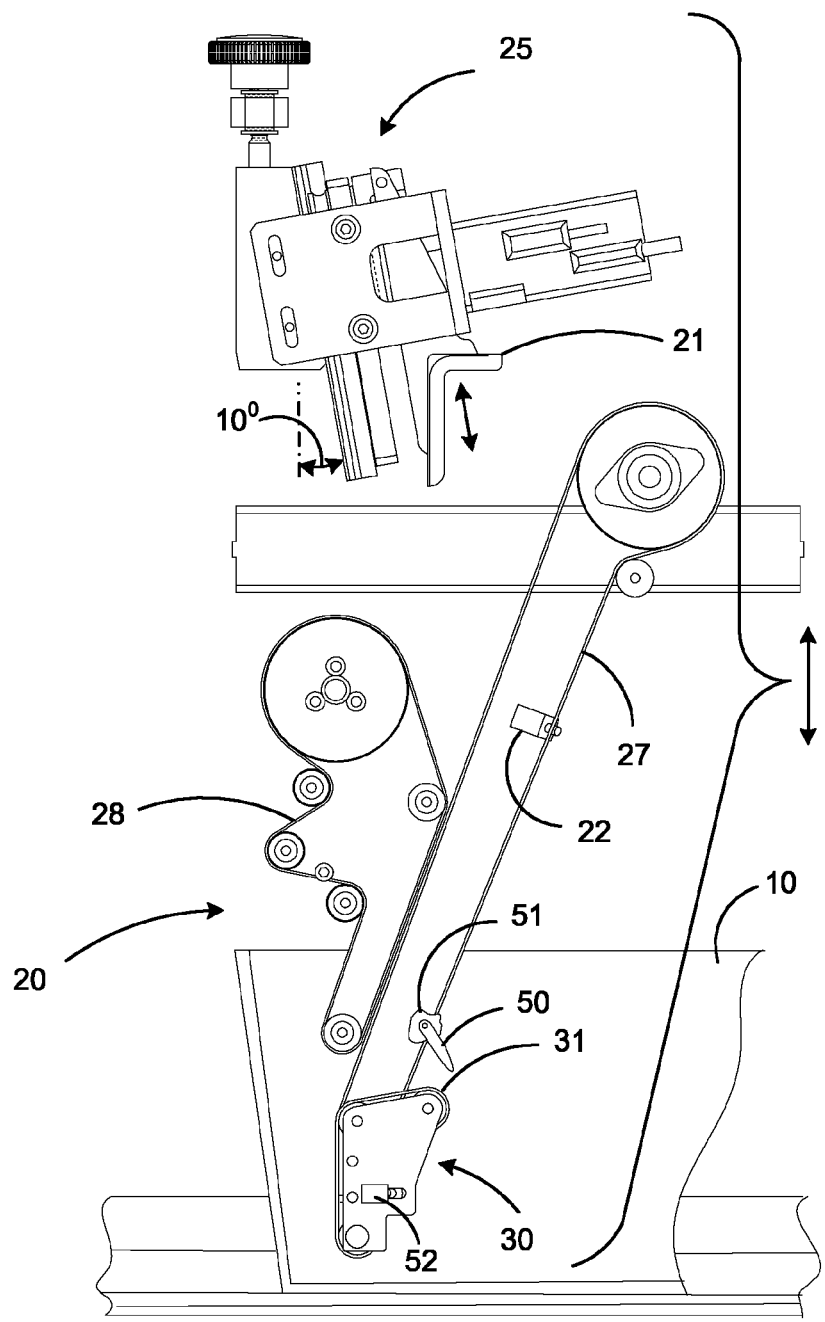
FIG. 5 is a side view of the mail tray filler showing the downward envelope path.

The side view of FIG. 5 shows further details of the downward tamping mechanism 25 and the feeding arm 20. As discussed above, an envelope is ejected from nips 12 so that it is free in open space beneath the downward tamping mechanism 25 and above the belts 27 and 28 of the feeder arm 20.

The downward tamping mechanism 25 is activated by the detection of a envelope being fed into the open space by an optical sensor 22.

The downward tamping mechanism 25 may include an inverted L shaped pusher 21 that imparts a downward impact on the free floating envelope. Tamping mechanism 25 preferably includes an actuator configured to move the pusher 21 up and down. The top of the pusher 21 pushes on the top edge of the envelope, while the vertical portion of the pusher 21 applies a steadying force on a face of the envelope.

In the preferred embodiment, the downward tamping mechanism is arranged so as to move at an angle that is not quite vertical. It has been found that moving the pusher 21 at an angle of ten degrees from vertical imparts both a vertical and horizontal force that causes the envelope to be reliably pushed into the opening in transport belts 27 and 28 below.

As seen in FIG. 5, belts 27 and 28 spread apart from each other in their upper reaches to facilitate the receipt of downward moving envelopes. Then the belts 27, 28 come together to form a typical belt transport for moving the envelope to the feeding head 30 that holds the pack of envelopes in the tray upright, and is angled so as to create a space for subsequent envelopes to be added to the pack.

Feeding head 30 includes a tray pressure sensor 52 used for detecting a pressure of the envelope pack in the tray 10 on the feeding head 30. Tray pressure sensor 52 may be a spring biased switch that is activated when a particular pressure is applied. Alternatively, the pressure sensor can be of a strain gauge variety that is capable of providing continuous measurements of the force being applied to the feed arm 20.

On a rear region of the feed arm 20 an end-of-tray sensor 50 can be mounted on the feed arm support structure 51. The end-of-tray sensor 50 may be a mechanical switch that is activated when it comes into contact with a rear wall of tray 10. Alternately, sensor 50 could be replaced with an optical sensor, or other type of proximity sensor, to achieve a similar result. An envelope sensor 22 is positioned proximal to the belts 27 and 28 to detect envelopes transported in the feeding arm 20.

Since the feeding arm 20 must be positioned within the tray 10 for feeding, it is necessary that it be lifted out when it is time to remove a completed tray and allow an empty tray to be positioned by the mail tray transport 7. For this reason the entire structure feeding arm 20 is mounted so as to be raised above the level of trays.

Figure 6:
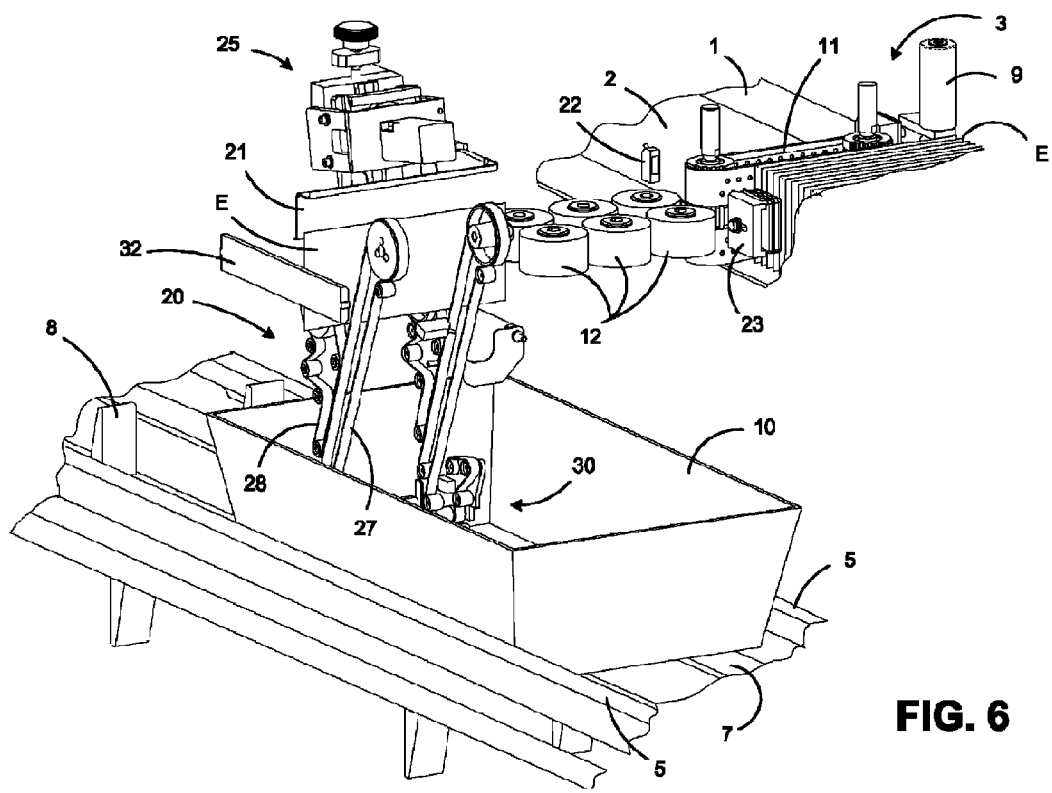
FIG. 6 is an isometric view showing an envelope that is undergoing a right angle turn in accordance with the preferred embodiment.
Figure 7:
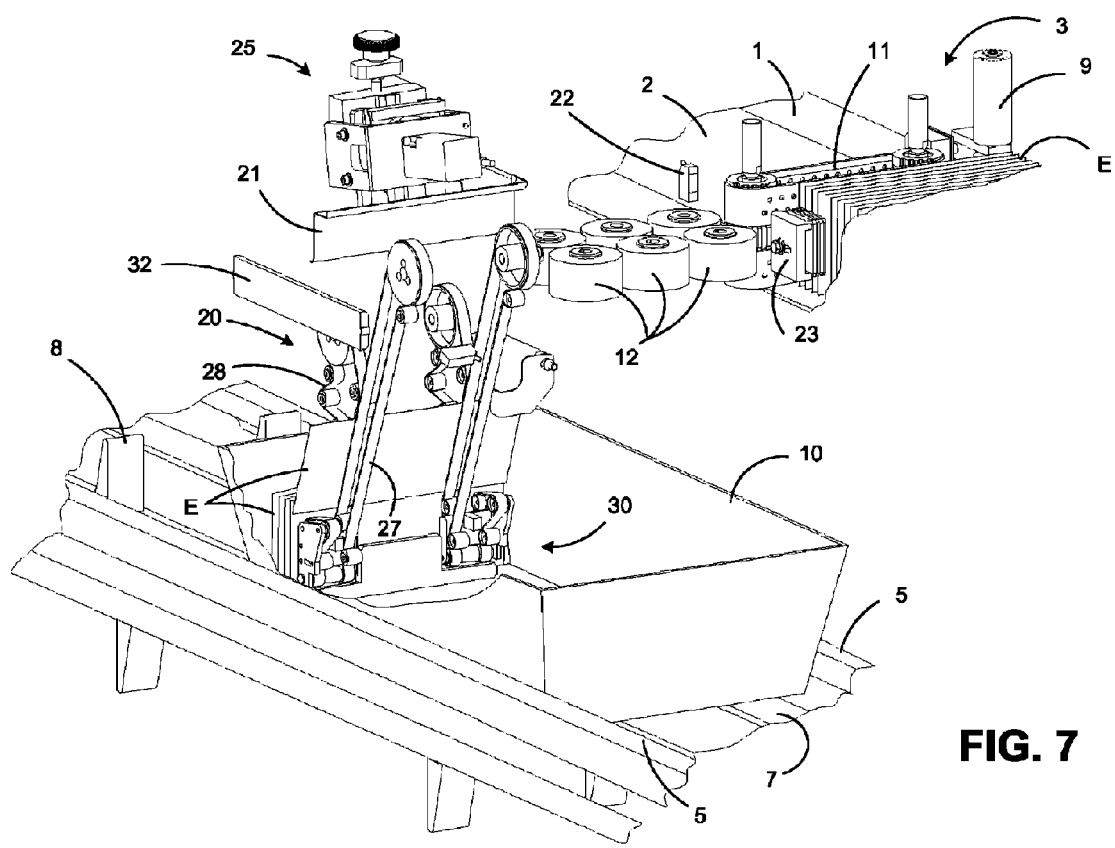
FIG. 7 is an isometric view showing an envelope as it is being deposited at the end of a stack of envelopes in a mail tray.

FIG. 6 shows an envelope E that has been ejected into the open space beneath the pusher 21. FIG. 7 shows the operation of feeding head 30 and belts 27, 28 in feeding an envelope E into the mail tray pack.

Figure 8:
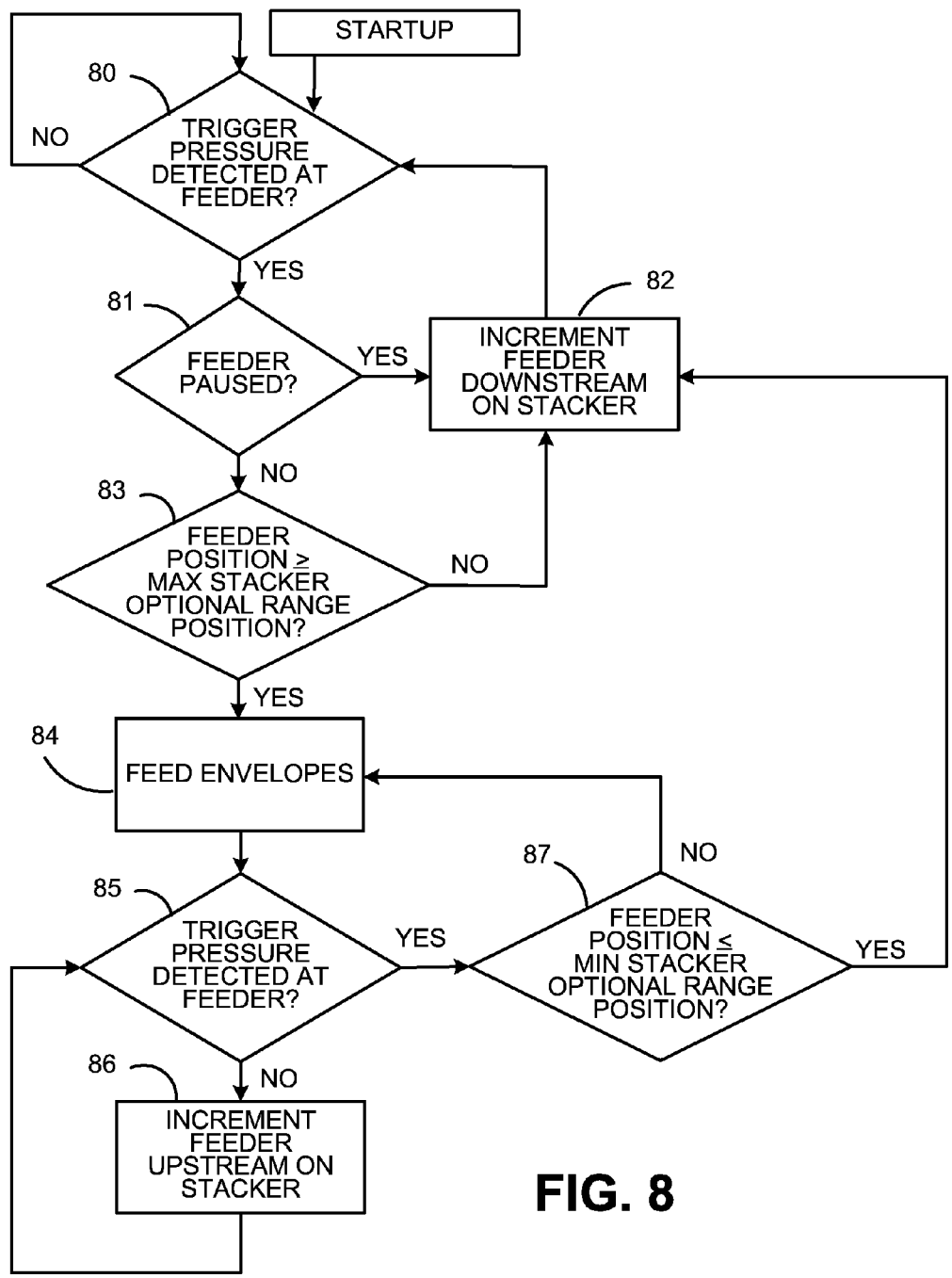
FIG. 8 is a flow diagram for controlling feeding and positioning of the mail tray filler and take-away feeder relative to the vertical stacker.

FIG. 8 shows a preferred implementation for controlling the position of the take-away feeder 3 along the length of the vertical stacker 1. It has been found that if the take-away feeder 3 is too close to the upstream end of the vertical stacker 1 then the stack pressure can be inconsistent for optimal feeding. Also, by running the feeder 3 so close to the input to the stacker 1 the benefits of using the stacker 1 as a buffer are lost.

If a stack gets too long on the stacker 1 then the shape of the stack can be affected by thickness variations in the uniformity of envelope thicknesses. For example, envelopes being thicker on one side than the other can cause a stack to form a curve. Another issue with operating the feeder 3 towards the end of the stacker 1 is that such an arrangement will require additional structure for supporting and transporting the trays on the tray transport 7. It may be more desirable to set a maximum length of the stack for feeding operations, rather than add extra floor-space footprint to the apparatus.

For these reasons, it has been found that the apparatus works best when feeding is maintained within an optimal range between a minimum and maximum stack length. When there are no envelopes on the stacker 1, the take-away feeder 1 does not start feeding until the stack length is within the optimal range. In the preferred embodiment, the stack is allowed to grow until it extends all the way to the maximum end of the optimal length. Then, as feeding progresses, the movable tray filler 6 and feeder 3 may gradually move closer to the upstream end of the stacker 1. If the feeder 3 gets closer than the minimum distance, then the feeder 3 stops, and the stack is allowed to grow again back to the maximum size in the optimal range. This range can be adjustable because different mail jobs will have different properties that may require different optimization.

The flow diagram of FIG. 8 shows the algorithm for the starting and maintaining the position of the feeder 3 within the optimal range. After starting the machine, with few or no envelopes accumulated in the stacker 1, the apparatus checks to see whether the stack is providing feeding pressure on the take-away feeder (step 80). If trigger pressure is not detected at the sensor 9, then nothing happens and the system waits for more envelopes. If trigger pressure is detected, then additional logic is applied. At step 81 the system checks to see whether the feeder is paused. For example, if a mail tray is being changed then envelopes are not fed from the stack. If the feeder is paused, then, rather than feeding, the feeder 3 is moved incrementally downstream to make room for more envelopes (step 82). The trigger pressure is adjustable for different mail jobs with envelopes having different properties, and the trigger pressure should be selected for optimal feeding by the vacuum belt 11.

If the feeder is not paused, the system checks the position of the feeder, which corresponds to the size of the stack (step 83). In the initial startup scenario, the system wants the stack to grow to the maximum size in the optimal range, so until the stack size is equal to, or greater than, the maximum size, the feeder will keep moving incrementally downstream (step 82).

Once the feeder position has reached the optimal maximum position, then feeding of envelopes starts (step 84). Once feeding has started, the sensor 9 continues to check for the feeding trigger pressure (step 85). If no trigger pressure is detected, then the feeder 3 is moved incrementally upstream, towards the stack, so that feeding can continue (step 86). At step 87, when trigger pressure is detected, the system again consults the stacker position to determine whether the feeder has moved past the minimum optimal stacker length. If the position is greater than the minimum, then feeding (step 84) continues. If the stack length shrinks to less than the minimum, then the process for sending the feeder 3 downstream to the optimal maximum length starts again (step 82, and 80, 81, 83).

Figure 9:
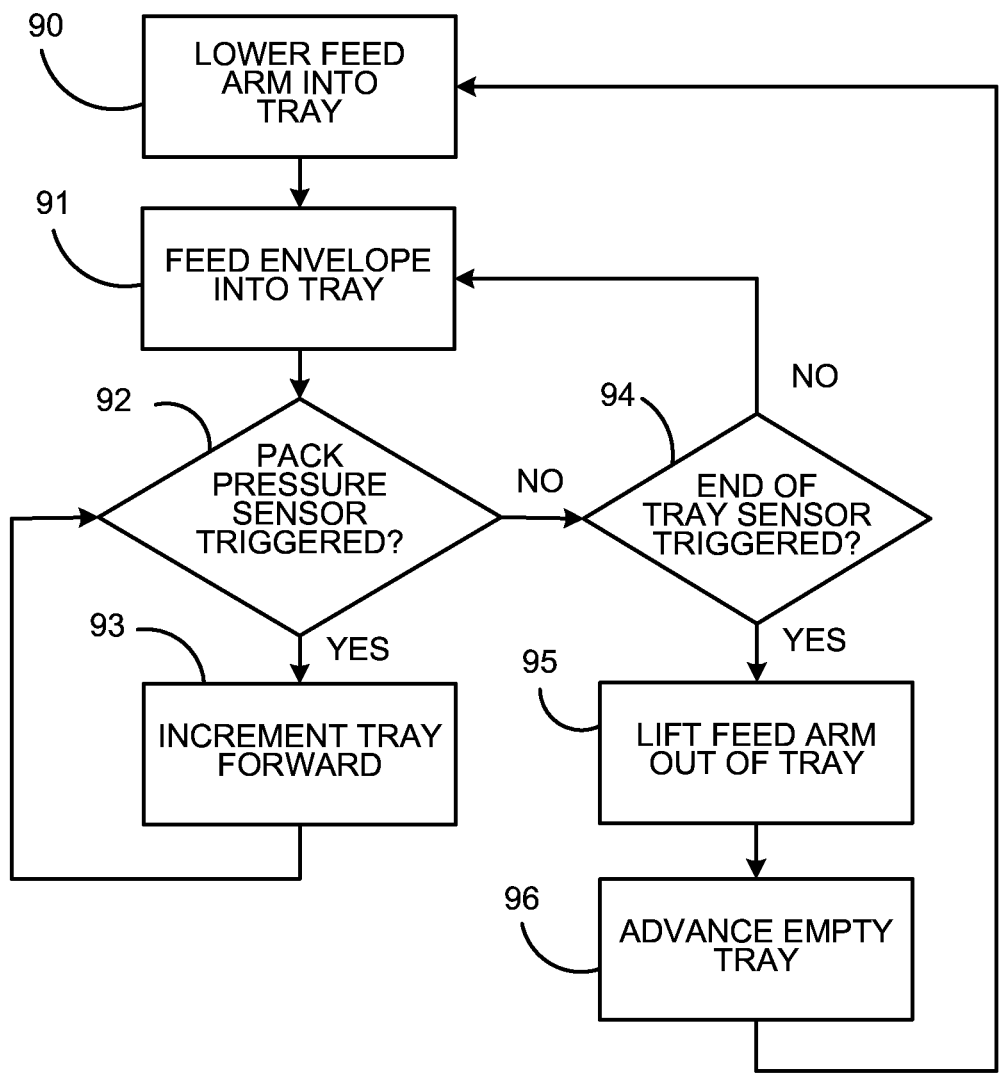
FIG. 9 is a flow diagram showing the operation of the arrangement for feeding envelopes downward into the mail tray.

In FIG. 9 a flow diagram shows the process for controlling the movement of the mechanism that places the envelopes into envelope packs in the mail trays. At step 90, after an empty mail tray has been moved into position, the feeding arm 20 is lowered into the tray 10 so that feed head 30 is in position to place the envelopes in their packed position. Then, envelopes are fed into the tray (step 91). During feeding, pack pressure sensor 52 determines whether a maximum pack pressure is being exceeded (step 92). If the pressure is being exceeded, then the friction for sliding a subsequent envelope into the pack may be too high, and the feeder could jam. The predetermined threshold for the pack pressure should be selected to maintain a firm vertical envelope stack at a pressure less than pressure that would cause friction to prevent subsequent envelopes from sliding into the stack. Thus, to make more room when the pack pressure is high, the tray 10 is incremented forward (step 93). Moving the tray forward is done by moving the tray transport downstream. Alternatively, this result could be achieved by moving the feed arm 20, and movable mail filler 6, upstream.

Concurrently, the tray end sensor 50 can be triggered if the tray has been moved along far enough to be almost full (step 94). Feeding resumes when the pack pressure sensor and the end of tray sensor are not triggered (step 91). If the end of tray sensor is triggered, then the feed arm 20 is lifted out of the tray (step 95) and an empty tray is advanced (step 96).

Alternatively, to detecting the end of the tray using a sensor, the system can keep track of how many envelopes have been fed into a tray. Since the thickness of the envelopes, and the capacity of the trays can be known in advance, the feed arm 20 removal and empty tray advancement steps may be based on reaching a predetermined count of envelopes. In some cases, there may be a particular need to fit a particular number of envelopes into a tray. In such cases, the pack pressure limits can be ignored when the feeding head 30 approaches the rear of the tray, in order that the desired quantity be filled.

Figure 10:
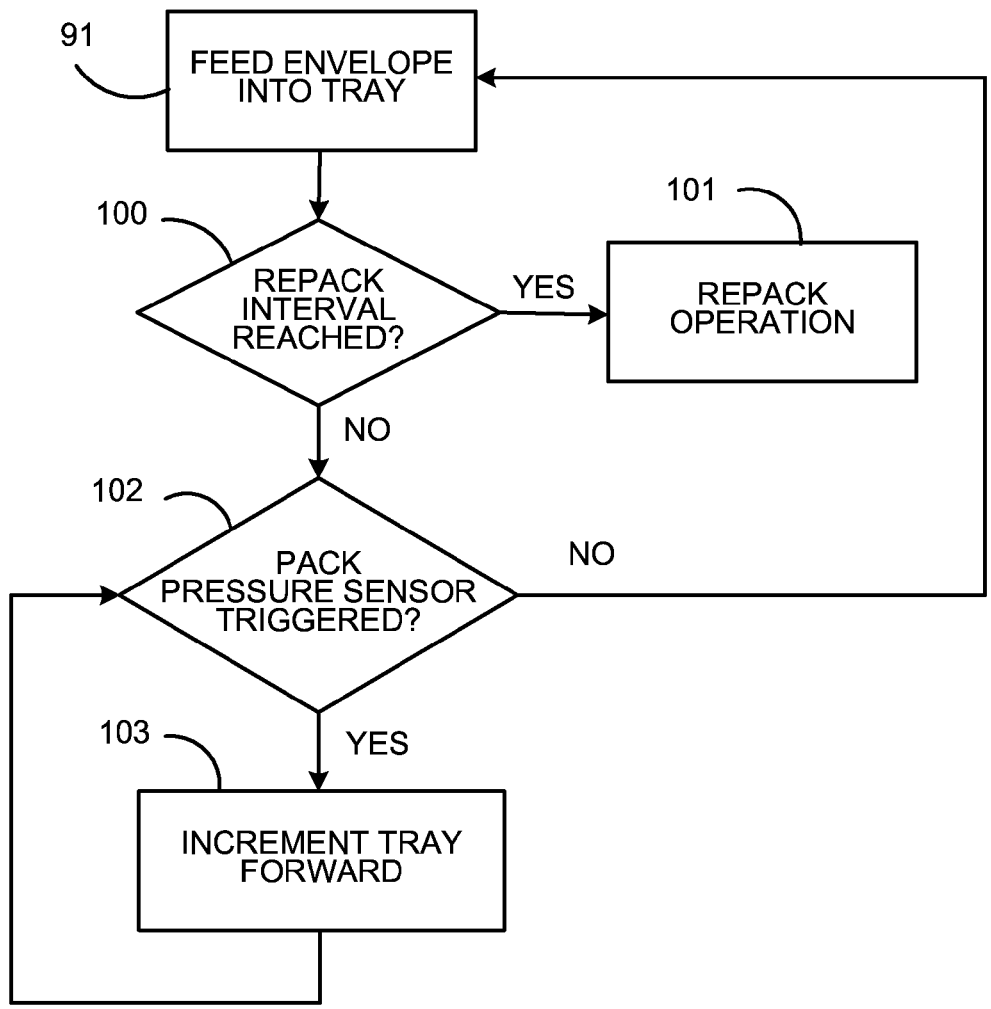
FIG. 10 is a flow diagram showing an operation for repacking envelopes already placed in a partially full tray.

FIG. 10 shows how an optional repack operation may be used in connection with the mail tray feeding. To fit more envelopes into a tray, it is sometimes desirable to "repack" the envelopes one or more times during filling of the tray. Repacking is an operation that squeezes the pack to push the envelopes closer together. The reduction in the size of the pack after repacking can be the result of squeezing out excess air and redistributing pressure within the pack.

Repack operations are performed at predetermined intervals (step 100). Such interval could be based on a quantity of envelopes fed, or on the distance the tray has moved during feeding. The number of repacks can be selected based on the importance of fitting a larger quantity of envelopes into a mail tray for a particular job. The repack interval may also be based on observation of a predetermined pressure profile being sensed on the feeding arm from the stack of envelopes, for example if the pack pressure sensor 52 was a strain gauge that found the pressure went below a predetermined threshold. If the predetermined interval has been reached, then a repack operation is performed (step 101). In the preferred embodiment, repacking is done by moving the mail tray transport 7 a predetermined distance in the upstream direct, thus forcing the envelope pack against the fed head 30. The repacking movement may also be a function of moving the relative position of the feed arm towards the front end of the mail tray until a predetermined pressure is detected on the feed arm by a pressure sensor 52 strain gauge. A similar result could be achieved by moving the feed arm 20 downstream. When a repack interval is not in effect then the normal feeding, pressure sensing and movement is in effect (steps 91, 102, 103).

Figure 11:
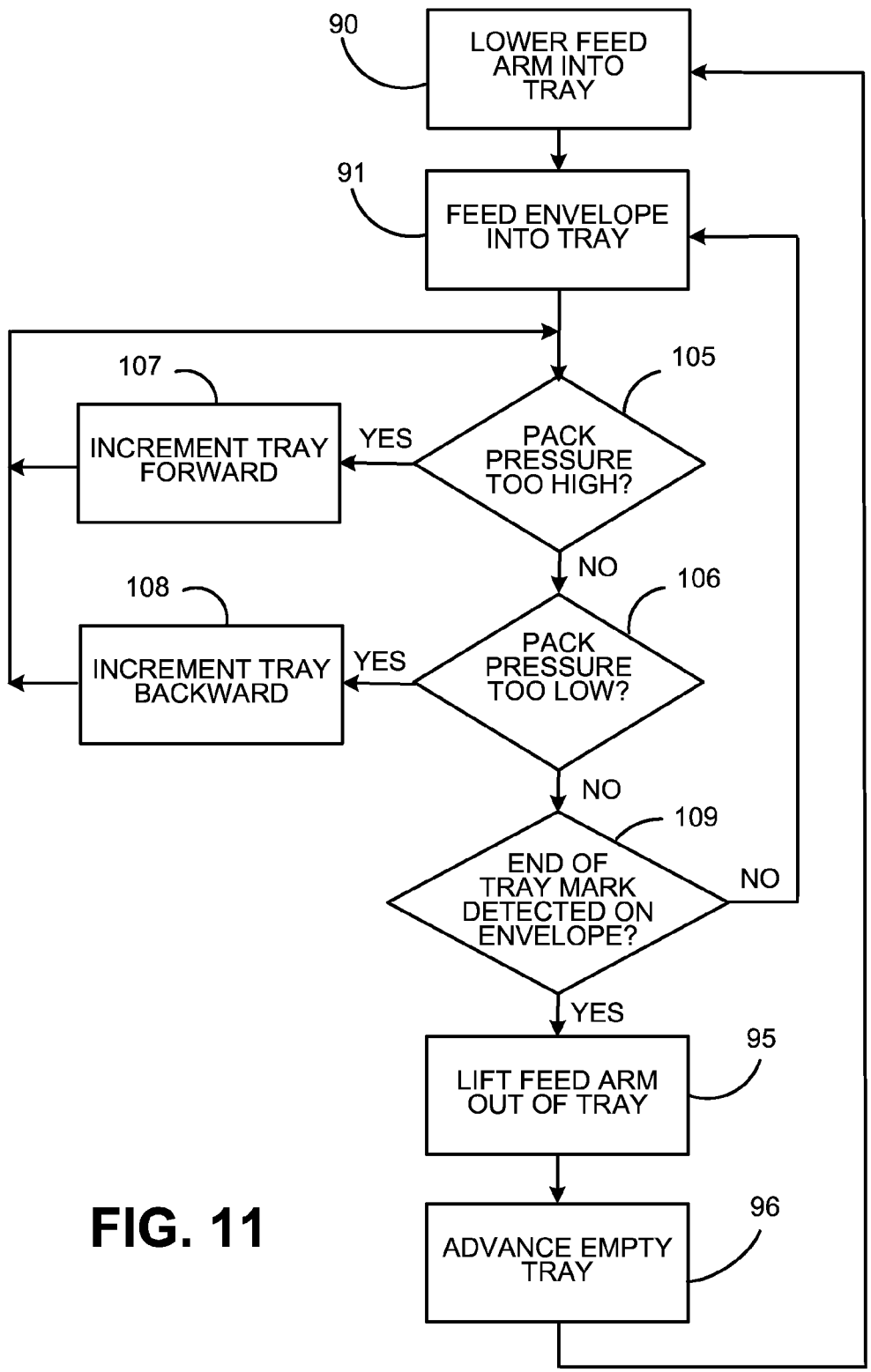
FIG. 11 is a flow diagram for an alternative mode of operating the arrangement for feeding envelopes downward into the mail tray.

FIG. 11 shows an alternative technique for controlling the movement while feeding envelopes into the tray. Since the pack pressure can vary as envelopes conform to their space, and excess air escapes, the pack pressure can increase and decrease during feeding. Thus, in addition to incrementing the mail tray forward to lessen the pack pressure, it may also be desirable move the mail tray backwards when the pack pressure decreases. This idea is similar to doing the repack operation described above, but it is done on a more continuous basis. For this type of motion control, the pack pressure sensor 52 should preferably be of the strain gauge variety so that force from the pack can be constantly measured.

Using this alternative technique, the system checks both whether the pack pressure is too high (step 105) or too low (step 106). If the pack pressure is too high, then the tray is incremented forward (step 107), similar to the method shown in FIG. 9. However, if the pack pressure is too low, then the tray is moved backward to bring the feed head into stronger contact with the pack (step 108). As discussed elsewhere the pressure settings for these steps is selectable to meet the particular properties of different mail jobs.

FIG. 11, also includes an alternate method of detecting the end of a tray. In this embodiment, the intended groupings of envelopes to be placed in trays is predetermined. A mark is printed, or otherwise made, on the intended final envelope for a particular tray group. An optical sensor, such as one of sensors 22, detects the end of tray marker on an envelope, no more envelopes are fed from the vertical stacker 1 for that particular tray (step 109). The feeding arm is lifted out of the tray, and an empty tray is advanced (steps 95, 96).

As a supplement to the end-of-tray marking technique, it may still be helpful to count the quantity of envelopes being fed into a tray. Then, if the mark is not sensed, the system can stop feeding if the quantity exceeds a predetermined maximum. This prevents the trays from overfilling and causing the feeding mechanisms to jam.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. An automated mail tray filling apparatus for taking envelopes from a vertical stacker output of an inserter machine and placing them in mail trays, the vertical stacker arranged to provide a vertical stack of finished envelopes on a long vertical stacker table, the vertical stacker table being capable of transporting the vertical stack away from an inserter output where envelopes are added to the vertical stack; the apparatus comprising:
   a track positioned next the vertical stacker table parallel to the length of the vertical stacker table;
   a mail tray transport positioned beneath the track and arranged to transport mail trays beneath the track in a direction parallel to the vertical stacker table;
   a movable mail tray filler movably mounted on the track to travel in parallel next to the vertical stacker table and above the mail tray transport and arranged to withdraw envelopes from a distal end of the vertical stack in a sideways direction, to redirect the envelopes into a downward direction of travel, and feeding the envelopes into a mail tray positioned beneath the movable mail tray filler;
   wherein the movable mail tray filler comprises a take-away feeder positioned over the vertical stacker table and arranged to withdraw individual envelopes from the vertical stack into the movable mail tray filler in a sideways direction perpendicular to the direction of the stack; and
   wherein the take-away feeder includes a pressure sensor on the take-away feeder to determine a pressure of the vertical stack on the take away feeder, and whereby the pressure sensor is coupled to a filler transport mechanism on the movable mail tray filler to cause the movable mail tray filler to move along the track when predetermined pressure conditions are present.

2. The apparatus of claim 1 wherein the filler transport mechanism is configured to move incrementally on the track towards the inserter output end of the vertical stacker when the vertical stack pressure is less than a predetermined threshold, thereby moving the take-away feeder into closer contact with the distal end of the vertical stack.

3. The apparatus of claim 1 wherein the filler transport mechanism is configured to move incrementally on the track away from the inserter output end of the vertical stacker when the vertical stack pressure is greater than a predetermined threshold, and the take-away feeder is in a non-feeding mode, thereby allowing the vertical stack to get longer.

4. An automated mail tray filling apparatus for taking envelopes from a vertical stacker output of an inserter machine and placing them in mail trays, the vertical stacker arranged to provide a vertical stack of finished envelopes on a long vertical stacker table, the vertical stacker table being capable of transporting the vertical stack away from an inserter output where envelopes are added to the vertical stack; the apparatus comprising:
   a track positioned next the vertical stacker table parallel to the length of the vertical stacker table;
   a mail tray transport positioned beneath the track and arranged to transport mail trays beneath the track in a direction parallel to the vertical stacker table;
   a movable mail tray filler movably mounted on the track to travel in parallel next to the vertical stacker table and above the mail tray transport and arranged to withdraw envelopes from a distal end of the vertical stack in a sideways direction, to redirect the envelopes into a downward direction of travel, and feeding the envelopes into a mail tray positioned beneath the movable mail tray filler;
   wherein the movable mail tray filler includes;
   a take-away feeder positioned over the vertical stacker table and arranged to withdraw individual envelopes from the vertical stack into the movable mail tray filler in a sideways direction perpendicular to the direction of the stack;
   a downward tamping mechanism downstream of the take-away feeder arranged to move downward to impart a downward push on a top edge of an unsecured free-floating envelope that has been ejected from the take-away feeder; and
   a downward transport positioned beneath the downward tamping mechanism and positioned to receive and transport falling envelopes pushed downward by the downward tamping mechanism.

5. The apparatus of claim 4 wherein the downward tamping mechanism comprises an inverted L shaped pusher.

6. The apparatus of claim 5, wherein the inverted L shaped pusher is positioned to contact the top edge of the envelope on an interior corner of the inverted L shaped pusher when the inverted L shaped pusher is imparting the downward push.

7. The apparatus of claim 6, wherein the inverted L shaped pusher is arranged to push downward toward the envelope at an acute angle, whereby the pusher imparts forces on both the top edge and on a side of the envelope.

* * * * *